US012748292B2

(12) United States Patent
Dong et al.

(10) Patent No.: US 12,748,292 B2
(45) Date of Patent: Sep. 29, 2026

(54) OPTICAL STRUCTURE AND DISPLAY DEVICE

(71) Applicant: Beijing Zitiao Network Technology Co., Ltd., Beijing (CN)

(72) Inventors: Shuai Dong, Beijing (CN); Xin Li, Beijing (CN); Xiaokai Li, Beijing (CN); Zhao Zhang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 258 days.

(21) Appl. No.: 18/572,129

(22) PCT Filed: Nov. 22, 2023

(86) PCT No.: PCT/CN2023/133107

§ 371 (c)(1),
(2) Date: Dec. 19, 2023

(87) PCT Pub. No.: WO2024/114462

PCT Pub. Date: Jun. 6, 2024

(65) Prior Publication Data

US 2025/0085523 A1 Mar. 13, 2025

(30) Foreign Application Priority Data

Nov. 30, 2022 (CN) ......................... 202211525103.0

(51) Int. Cl.
*G02B 17/08* (2006.01)

(52) U.S. Cl.
CPC ................................ *G02B 17/0856* (2013.01)

(58) Field of Classification Search
CPC ............ G02B 17/0856; G02B 27/0101; G02B 2027/0178; G02B 27/01; G02B 27/0172; G02B 27/286
See application file for complete search history.

(56) References Cited

U.S. PATENT DOCUMENTS

2020/0284963 A1* 9/2020 Yun ...................... G02B 5/3083
2022/0099988 A1* 3/2022 Liang .................. H04N 9/3152
(Continued)

FOREIGN PATENT DOCUMENTS

CN 207946592 U 10/2018
CN 110308559 A 10/2019
(Continued)

OTHER PUBLICATIONS

Extended European Search Report for European Patent Application No. 23896613.9, mailed on May 21, 2026, 12 pages.

*Primary Examiner* — Mariam Qureshi
(74) *Attorney, Agent, or Firm* — Astute IP Law Group

(57) ABSTRACT

An optical structure and a display device are provided. The optical structure includes a first lens and a transflective film. The first lens includes a first surface and a second surface, the first surface and the second surface are non-planar surfaces; the transflective film is located at a side of the first surface away from the second surface. The optical structure further includes a light-transmitting flat plate assembly located at a side of the second surface away from the first surface, and the light-transmitting flat plate assembly includes a light-transmitting flat plate, a phase retardation film and a polarizing reflective film, the polarizing reflective film is located at a side of the phase retardation film away from the first lens, and the phase retardation film and the polarizing reflective film are located on a flat plate surface of the light-transmitting flat plate or inside the light-transmitting flat plate.

20 Claims, 11 Drawing Sheets

(56) References Cited

U.S. PATENT DOCUMENTS

| | | | | |
|---|---|---|---|---|
| 2023/0236422 | A1* | 7/2023 | Wu | G02B 27/0172 359/630 |
| 2023/0418080 | A1* | 12/2023 | Wang | G02B 5/3083 |

FOREIGN PATENT DOCUMENTS

| | | | | | |
|---|---|---|---|---|---|
| CN | 213600993 | U | | 7/2021 | |
| CN | 113391447 | A | | 9/2021 | |
| CN | 113934007 | A | * | 1/2022 | G02B 27/0172 |
| CN | 114236865 | A | | 3/2022 | |
| CN | 216285989 | U | | 4/2022 | |
| CN | 216351550 | U | | 4/2022 | |
| CN | 114942523 | A | | 8/2022 | |
| WO | 2017/128183 | A1 | | 8/2017 | |

* cited by examiner

OPTICAL STRUCTURE AND DISPLAY DEVICE

CROSS-REFERENCE TO RELATED APPLICATION

This is a national stage application based on International Patent Application No. PCT/CN2023/133107, filed Nov. 22, 2023, which claims priority to Chinese Patent Application No. 202211525103.0, filed on Nov. 30, 2022, the disclosures of which are incorporated herein by reference in their entireties.

TECHNICAL FIELD

The present disclosure relates to an optical structure and a display device.

BACKGROUND

Virtual Reality (VR) product is a kind of human-computer interaction product created with the help of computer and sensor technology, which enables users to experience immersion in an interactive three-dimensional environment. At present, the technologies used in virtual reality products include Fresnel lens and ultra-short focal folded optical path (Pancake), in which Pancake greatly reduces the required distance between near-eye display devices and human eyes, thus making VR devices lighter and thinner.

SUMMARY

The present disclosure provides an optical structure and a display device. The optical structure includes a first lens and a transflective film. The first lens includes a first surface and a second surface, both the first surface and the second surface are non-planar surfaces; the transflective film is located at a side of the first surface away from the second surface. The optical structure further includes a light-transmitting flat plate assembly located at a side of the second surface away from the first surface, and the light-transmitting flat plate assembly includes a light-transmitting flat plate, a phase retardation film and a polarizing reflective film, the polarizing reflective film is located at a side of the phase retardation film away from the first lens, and both the phase retardation film and the polarizing reflective film are located on a flat plate surface of the light-transmitting flat plate or inside the light-transmitting flat plate.

For example, according to the present disclosure, the light-transmitting flat plate includes at least two flat plate surfaces arranged in parallel and perpendicular to an optical axis of the first lens, the phase retardation film and the polarizing reflective film are located on different flat plate surfaces, and the at least two flat plate surfaces are both planes.

For example, according to the present disclosure, the light-transmitting flat plate assembly further includes a polarizing transmissive film, the polarizing transmissive film is located at a side of the polarizing reflective film away from the phase retardation film, and the polarizing transmissive film is located on the flat plate surface of the light-transmitting flat plate or inside the light-transmitting flat plate.

For example, according to the present disclosure, the light-transmitting flat plate includes two flat plate surfaces arranged in parallel and perpendicular to an optical axis of the first lens, one of the phase retardation film, the polarizing reflective film and the polarizing transmissive film is located on one flat plate surface, and two of the phase retardation film, the polarizing reflective film and the polarizing transmissive film are located on the other flat plate surface, and the two flat plate surfaces are both planes.

For example, according to the present disclosure, the phase retardation film is located on the flat plate surface, close to the first lens, in the two flat plate surfaces, and the polarizing reflective film and the polarizing transmissive film are both located on the flat plate surface, away from the first lens, in the two flat plate surfaces.

For example, according to the present disclosure, the light-transmitting flat plate assembly further includes an antireflection film, the antireflection film is located at a side of the phase retardation film away from the polarizing reflective film.

For example, according to the present disclosure, the light-transmitting flat plate includes two flat plate surfaces arranged in parallel and perpendicular to an optical axis of the first lens, and the phase retardation film, the polarizing reflective film and the polarizing transmissive film are all located on a same flat plate surface, and the two flat plate surfaces are both planes.

For example, according to the present disclosure, the light-transmitting flat plat includes a plurality of sub-flat plates arranged along a direction parallel to an optical axis of the first lens, and each of the plurality of sub-flat plates includes two flat plate surfaces arranged in parallel and perpendicular to the optical axis of the first lens; the phase retardation film, the polarizing reflective film and the polarizing transmissive film are all located in intervals between the plurality of sub-flat plates.

For example, according to the present disclosure, the light-transmitting flat plat includes a plurality of sub-flat plates arranged along a direction parallel to an optical axis of the first lens, and each of the plurality of sub-flat plates includes two flat plate surfaces arranged in parallel and perpendicular to the optical axis of the first lens; at least one selected from the group consisting of the phase retardation film, the polarizing reflective film and the polarizing transmissive film is located on the flat plate surface, close to the first lens, of a sub-flat plate in the plurality of sub-flat plates which is closest to the first lens.

For example, according to the present disclosure, the plurality of sub-flat plates include a first sub-flat plate and a second sub-flat plate, the first sub-flat plate is located between the second sub-flat plate and the first lens, and the phase retardation film, the polarizing reflective film and the polarizing transmissive film are all located between the first sub-flat plate and the second sub-flat plate.

For example, according to the present disclosure, the plurality of sub-flat plates include a first sub-flat plate and a second sub-flat plate, the first sub-flat plate is located between the second sub-flat plate and the first lens, and the phase retardation film is located on the flat plate surface of the first sub-flat plate facing the first lens, and the polarizing transmissive film is located between the first sub-flat plate and the second sub-flat plate.

For example, according to the present disclosure, the plurality of sub-flat plates include a first sub-flat plate, a second sub-flat plate and a third sub-flat plate sequentially arranged, the first sub-flat plate is located between the second sub-flat plate and the first lens, and the phase retardation film, the polarizing reflective film and the polarizing transmissive film are located in the intervals between the first sub-flat plate, the second sub-flat plate and the third sub-flat plate.

For example, according to the present disclosure, the plurality of sub-flat plates include a first sub-flat plate, a second sub-flat plate and a third sub-flat plate sequentially arranged, the first sub-flat plate is located between the second sub-flat plate and the first lens, and the phase retardation film is located on the flat plate surface of the first sub-flat plate facing the first lens, the polarizing reflective film is located between the first sub-flat plate and the second sub-flat plate, and the polarizing transmissive film is located between the second sub-flat plate and the third sub-flat plate.

For example, according to the present disclosure, the plurality of sub-flat plates include four sub-flat plates sequentially arranged, and the phase retardation film, the polarizing reflective film and the polarizing transmissive film are respectively arranged between two adjacent sub-flat plates.

For example, according to the present disclosure, the phase retardation film, the polarizing reflective film and the polarizing transmissive film are all arranged inside the light-transmitting flat plate, and a portion of the light-transmitting flat plate at a side of the phase retardation film away from the polarizing reflective film and a portion of the light-transmitting flat plate at a side of the polarizing transmissive film away from the phase retardation film are arranged as an integrated structure.

For example, according to the present disclosure, a focal length of the optical structure is in a range from 5 to 100 mm.

For example, according to the present disclosure, in a direction parallel to an optical axis of the first lens, a maximum thickness of the first lens is in a range from 1 to 10 mm, a thickness of the light-transmitting flat plate is in a range from 0.1 to 5 mm, and a distance between the first lens and the light-transmitting flat plate is in a range from 0.5 to 100 mm.

For example, according to the present disclosure, at least one of the first surface and the second surface is aspheric or spherical.

For example, according to the present disclosure, a material of the light-transmitting flat plate includes glass or plastic.

For example, according to the present disclosure, the optical structure further includes: a second lens, including a third surface and a fourth surface, and at least one of the third surface and the fourth surface is a non-planar surface. The second lens is located between the first lens and the light-transmitting flat plate assembly, or the second lens is located at a side of the light-transmitting flat plate assembly away from the first lens.

The present disclosure provides a display device, which includes a display screen and any optical structure as mentioned above. The display screen is located at a side of the first lens away from the light-transmitting flat plate assembly.

In the optical structure provided by the present disclosure, by arranging the light-transmitting flat plate assembly including the light-transmitting flat plate, the phase retardation film and the polarizing reflective film, and arranging the phase retardation film and the polarizing reflective film on the flat plate surface of the light-transmitting flat plate or inside the light-transmitting flat plate, the optical structure can have good optical performance and the manufacturing cost of the optical structure can be reduced.

BRIEF DESCRIPTION OF DRAWINGS

In order to clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
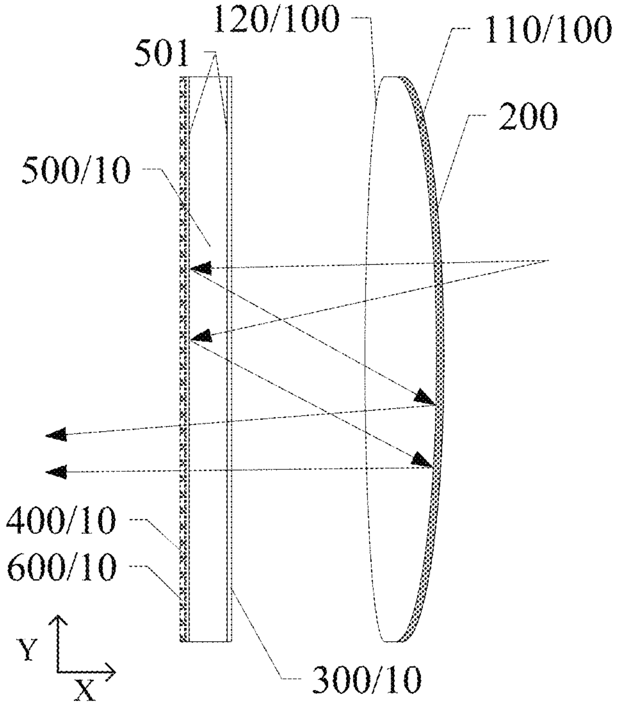
FIG. 1 is a partial structural schematic diagram of an optical structure provided by an example of an embodiment of the present disclosure.

In order to make objects, technical solutions and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

The embodiment of the present disclosure provides an optical structure and a display device. The optical structure comprises a first lens and a transflective film, the first lens comprises a first surface and a second surface, and both the first surface and the second surface are non-planar surfaces; the transflective film is located at a side of the first surface away from the second surface. The optical structure further comprises a light-transmitting flat plate assembly located at a side of the second surface away from the first surface, and the light-transmitting flat plate assembly comprises a light-transmitting flat plate, a phase retardation film and a polarizing reflective film, the polarizing reflective film is located at a side of the phase retardation film away from the first lens, and both the phase retardation film and the polarizing reflective film are located on a flat plate surface of the light-transmitting flat plate or inside the light-transmitting flat plate. According to the optical structure provided by the present disclosure, by arranging the light-transmitting flat plate assembly including the light-transmitting flat plate, the phase retardation film and the polarizing reflective film, and arranging the phase retardation film and the polarizing reflective film on the flat plate surface of the light-transmitting flat plate or inside the light-transmitting flat plate, the optical structure can have good optical performance and reduce the manufacturing cost of the optical structure.

Hereinafter, the optical structure and the display device provided by the embodiments of the present disclosure will be described in detail with reference to the accompanying drawings.

FIG. 1 is a partial structural schematic diagram of an optical structure provided by an example of an embodiment of the present disclosure. As illustrated by FIG. 1, the optical structure includes a first lens 100, a transflective film 200, and a light-transmitting flat plate assembly 10. The first lens 100 includes a first surface 110 and a second surface 120, both of which are non-planar surfaces. For example, at least one of the first surface 110 and the second surface 120 is aspheric or spherical. For example, both the first surface 110 and the second surface 120 are aspherical or spherical, or one of the first surface 110 and the second surface 120 is spherical and the other is aspherical. The optical structure provided by the present disclosure is not limited thereto, and the first surface and the second surface may also include free-form surfaces and the like. For example, the first lens 100 is a single lens. For example, the first surface 110 is bent to a side away from the light-transmitting flat plate assembly 10 to form a convex surface, and the second surface 120 is bent to a side close to the light-transmitting flat plate assembly 10 to form a convex surface.

For example, the second surface 120 may be located at a light-exiting side of the first surface 110. For example, in the case where the optical structure is applied to a display device, a display screen is located at a side of the first surface 110 of the first lens 100 away from the second surface 120, and light emitted by the display screen enters the first lens 100 after passing through the first surface 110, and then the light is exited from the second surface 120.

As illustrated by FIG. 1, the transflective film 200 is located at a side of the first surface 110 of the first lens 100 away from the second surface 120. For example, the transflective film 200 is configured to transmit part of light and reflect another part of the light. For example, the transflective film 200 may include at least one film layer, for example, a thickness of each film layer may be 10 to 200 nanometers. For example, the transflective film 200 may have a transmittance of 50% and a reflectivity of 50%. For example, the transflective film 200 may have the transmittance of 60% and the reflectivity of 40%. For example, the transflective film 200 may have the transmittance of 65% and the reflectivity of 35%. The optical structure provided by the present disclosure is not limited thereto, and the transmittance and reflectivity of the transflective film can be set according to product requirements. For example, the transflective film 200 may be plated on the first surface 110.

As illustrated by FIG. 1, the optical structure further includes the light-transmitting flat plate assembly 10 located at a side of the second surface 120 away from the first surface 110. The light-transmitting flat plate assembly 10 includes a light-transmitting flat plate 500, a phase retardation film 300 and a polarizing reflective film 400 located at a side of the phase retardation film 300 away from the first lens 100. Both the phase retardation film 300 and the polarizing reflective film 400 are located on a flat plate surface 501 of the light-transmitting flat plate 500 or inside the light-transmitting flat plate 500.

For example, as illustrated by FIG. 1, the light-transmitting flat plate 500 can also be called an optical flat plate. In the case where the phase retardation film 300 and the polarizing reflective film 400 are arranged on the flat plate surface 501 of the light-transmitting flat plate 500, the light-transmitting flat plate 500 includes at least one flat plate surface 501 on which both the phase retardation film 300 and the polarizing reflective film 400 are located. For example, the light-transmitting flat plate 500 includes two flat plate surfaces 501 with planar shape which are parallel to each other and perpendicular to an optical axis of the first lens 100, and the optical axis of the first lens 100 extends along a X direction illustrated by FIG. 1, that is to say, the two flat plate surfaces 501 are perpendicular to the X direction illustrated by FIG. 1, and the phase retardation film 300 and the polarizing reflective film 400 are arranged on at least one of the two flat plate surfaces 501. For example, the light-transmitting flat plate refers to a flat plate-shaped structure capable of transmitting light, and the flat plate shape may include a rectangular parallelepiped.

For example, as illustrated by FIG. 1, the phase retardation film 300 is configured such that transmitted light realizes a conversion between a circular polarization state and a linear polarization state. For example, the phase retardation film 300 may be a quarter wave plate. For example, a material of the phase retardation film may include a liquid crystal polymer or polycarbonate. For example, the phase retardation film 300 has following characteristics: there is a direction with a lowest refractive index and a direction with a highest refractive index in a plane of the film, which are a fast axis and a slow axis, respectively. A phase of polarized light parallel to the slow axis after passing through the phase retardation film 300 is delayed by ¼ wavelength compared with a phase of polarized light parallel to the fast axis after passing through the phase retardation film 300.

For example, as illustrated by FIG. 1, the polarizing reflective film 400 has following functions: there is a light-transmitting axis direction in a plane of the film, and a transmittance of polarized component (such as S-linearly polarized light) parallel to the light-transmitting axis direction of incident light is greater than a transmittance of polarized component (such as P-linearly polarized light) perpendicular to the light-transmitting axis direction of incident light, and a reflectivity of polarized component (such as S-linearly polarized light) parallel to the light-transmitting axis direction of incident light is less than a reflectivity of polarized component (such as P-linearly polarized light) perpendicular to the light-transmitting axis direction of incident light. For example, the polarizing reflective film 400 may also be called a polarization splitting film. For example, the transmittance of polarized light parallel to the light-transmitting axis direction of the polarizing reflective film 400 is not less than 85%, such as not less than 90%, such as not less than 95%, such as not less than 98%. The reflectivity of polarized light perpendicular to the light-transmitting axis direction of the polarizing reflective film 400 is not less than 85%, such as not less than 90%, such as not less than 95%, such as not less than 98%. For example, the polarizing reflective film 400 may include a reflective dual brightness enhancement film (DBEF), a liquid crystal polymer film based on cholesteric phase and the like.

For example, as illustrated by FIG. 1, an included angle between the slow axis of the phase retardation film 300 and the light-transmitting axis of the polarizing reflective film 400 is 45 degrees.

In some examples, as illustrated by FIG. 1, the light-transmitting flat plate assembly 10 further includes a polarizing transmissive film 600 located at a side of the polarizing reflective film 400 away from the phase retardation film 300, and the polarizing transmissive film 600 is located on the flat plate surface 501 of the light-transmitting flat plate 500 or inside the light-transmitting flat plate 500.

For example, as illustrated by FIG. 1, a light-transmitting axis of the polarizing transmissive film 600 coincides with the light-transmitting axis of the polarizing reflective film 400. For example, the polarizing transmissive film 600 can be a linearly polarized film for further filtering other stray light, and only polarized light (such as S-linearly polarized light) passing through the polarizing transmissive film 600 is allowed to enter human eyes. For example, a material of the polarizing transmissive film 600 may include polyvinyl alcohol (PVA) added with dichroism molecules, a liquid crystal polymer film added with dichroism molecules, and the like.

As illustrated by FIG. 1, the optical structure provided by the present disclosure adopts an ultra-short focal folded optical path (Pancake), and the principle of the folded optical path is as follows: a wave plate can be arranged at a light-exiting side of a display screen, the display screen is at a side of the first lens 100 away from the light-transmitting flat plate 500, and image light emitted from the display screen is converted into right-handed circularly polarized light after passing through the wave plate, and a polarized state of the right-handed circularly polarized light remains unchanged after being transmitted through the transflective film 200. The right-handed circularly polarized light passes through the first lens 100 and reaches the phase retardation film 300. The right-handed circularly polarized light incident on the phase retardation film 300 is converted into P-linearly polarized light, and the P-linearly polarized light is reflected back to the phase retardation film 300 by the polarizing reflective film 400, where a first reflection occurs. Then, the p-linearly polarized light passes through the phase retardation film 300 and is converted into right-handed circularly polarized light. The right-handed circularly polarized light passes through the first lens 100, reaches the transflective film 200, and is reflected at the transflective film 200, where a second reflection occurs. Because of half-wave loss, reflected light changes from right-handed circularly polarized light to left-handed circularly polarized light. The left-handed circularly polarized light reaches the phase retardation film 300 after being transmitted by the first lens 100, and the left-handed circularly polarized light is converted into S-linearly polarized light through the phase retardation film 300, and then the S-linearly polarized light is transmitted through the polarizing reflective film 400 and the polarizing transmissive film 600 and then emitted to human eyes.

The folded optical path as mentioned above can change the polarized state of the light propagating between the polarizing reflective film and the transflective film, and the folding of the light can be realized, so that an original focal length of the optical structure is folded because of, for example, two reflections increased by the arrangement of the polarizing reflective film, the phase retardation film and the transflective film, thereby greatly compressing a space required between human eyes and the optical structure, and thus making the optical structure smaller and thinner.

The optical structure provided by the embodiment of the present disclosure is an optical structure adopting a focal folded optical path (Pancake). In the optical structure, both surfaces of the first lens are non-planar surfaces, and at the same time, by arranging the light-transmitting flat plate, the phase retardation film and the polarizing reflective film on the flat plate surface of the light-transmitting flat plate or inside the light-transmitting flat plate, the design freedom of the optical structure is improved to improve the display performance including definition, field angle and the like, and a thickness of the optical structure is reduced by folding a longer light path, and the cost and manufacturing process of the optical structure are not obviously increased.

In some examples, as illustrated by FIG. 1, the light-transmitting flat plate 500 includes at least two flat plate surfaces 501 arranged in parallel and perpendicular to the optical axis of the first lens 100. The phase retardation film 300 and the polarizing reflective film 400 are located on different flat plate surfaces 501, and the at least two flat plate surfaces 501 are both planes. For example, by selecting a material of the light-transmitting flat plate 500, the flat plate surfaces 501 of the light-transmitting flat plate 500 can all be hard planes.

For example, as illustrated by FIG. 1, the phase retardation film 300 and the polarizing reflective film 400 are located on two flat plate surfaces 501 of a same light-transmitting flat plate 500 which are away from each other. For example, a distance between the phase retardation film 300 and the polarizing reflective film 400 is at least a thickness of one light-transmitting flat plate 500. The thickness of the light-transmitting flat plate 500 as mentioned above refers to a dimension of the light-transmitting flat plate 500 in the X direction. For example, the light-transmitting flat plate 500 is a flat plate structure with uniform thickness.

On the one hand, in a pancake structure, ghost and stray light are a key index affecting experience; in an optical structure adopting a focal folded optical path (Pancake), an angle between the films, especially an angle fluctuation between the phase retardation film and the polarizing reflective film, such as an angle between the slow axis of the phase retardation film and the light-transmitting axis of the polarizing reflective film is not exactly 45 degrees, which is the main factor causing stray light and ghost. By arranging the phase retardation film and the polarizing reflective film on the surfaces of two different flat plate surfaces of the light-transmitting flat plate, it is convenient to attach separately the phase retardation film and the polarizing reflective film, so that an optical axis of the phase retardation film can be corrected in the attaching process. For example, a polarized sensor can be used to measure a direction with an included angle of 45 degrees with the light-transmitting axis of the polarizing reflective film, such as a direction with the largest circularly skewness polarized state and then the phase retardation film can be attached. The arrangement of the positions of the phase retardation film and the polarizing reflective film is beneficial to reducing stray light and ghost.

On the other hand, both the phase retardation film and the polarizing reflective film are made of birefringent materials, and an internal stress in the light-transmitting flat plate affects the birefringence characteristics of the phase retardation film and the polarizing reflective film, thus affecting the polarization state change of light in the folded optical path, which is easy to generate stray light. The light-transmitting flat plate provided by the present disclosure has the characteristics of high processing maturity, and various materials and low-cost processing methods can be selected for processing. By controlling the internal stress to a low level during the processing of the light-transmitting flat plate, it is beneficial to reduce stray light caused by birefringence deviation of the phase retardation film and the polarizing reflective film.

On the other hand, both the phase retardation film and the polarizing reflective film are attached on the flat plate surface with planar shape, so as to improve the flatness of the film material, avoid the deviation of birefringence properties such as optical axis angle and phase delay caused by the softening and stretching process of the film material, and be beneficial to improving the comprehensive optical properties such as clarity, stray light and field of view angle of the optical structure. For example, the above-mentioned phase retardation film can be a phase retardation film with an inverse dispersion retardation curve, and the phase difference in a thickness direction of the phase retardation film can be changed at a large viewing angle, and the phase difference in the thickness direction of the phase retardation film can be compensated by the C phase retardation film, so that the phase delay is relatively stable, so as to improve the polarization conversion efficiency.

In some examples, as illustrated by FIG. 1, the light-transmitting flat plate 500 includes two flat plate surfaces 501 arranged in parallel and perpendicular to the optical axis of the first lens 100, one of the phase retardation film 300, the polarizing reflective film 400 and the polarizing transmissive film 600 is located on one flat plate surface 501, and two of the phase retardation film 300, the polarizing reflective film 400 and the polarizing transmissive film 600 are located on the other flat plate surface 501.

In some examples, as illustrated by FIG. 1, the phase retardation film 300 is located on the flat plate surface 501, close to the first lens 100, in the two flat plate surfaces 501, and the polarizing reflective film 600 is located on the flat plate surface 501, away from the first lens 100, in the two flat plate surfaces 501.

For example, as illustrated by FIG. 1, the phase retardation film 300 is attached to the flat plate surface 501 of the light-transmitting flat plate 500 close to the first lens 100, and the polarizing transmissive film 600 and the polarizing reflective film 400 are attached to the flat plate surface 501 of the light-transmitting flat plate 500 away from the first lens 100, which is beneficial to improving the attachment flatness of the film material and improving the optical performance of the optical structure.

Figure 2:
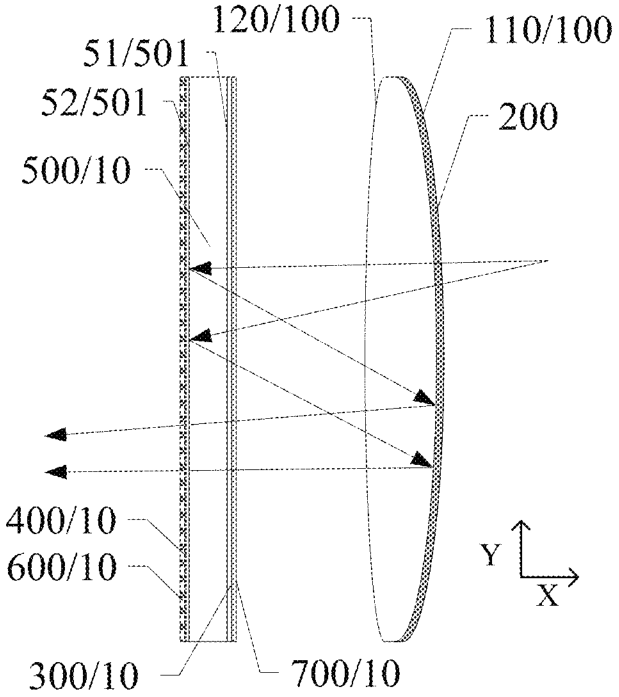
FIGS. 2 to 5 are partial structural schematic diagrams of optical structures provided by different examples of embodiments of the present disclosure.

FIG. 2 is a partial structural diagram of an optical structure provided by another example of an embodiment of the present disclosure. The optical structure illustrated by FIG. 2 is different from the optical structure illustrated by FIG. 1 in that the light-transmitting flat plate assembly 10 further includes an antireflection film 700, which is located at a side of the phase retardation film 300 away from the polarizing reflective film 400.

The first lens 100, the transflective film 200, the light-transmitting flat plate 500, the phase retardation film 300, the polarizing reflective film 400 and the polarizing transmissive film 600 in the optical structure illustrated by FIG. 2 may have the same characteristics as the first lens 100, the transflective film 200, the light-transmitting flat plate 500, the phase retardation film 300, the polarizing reflective film 400 and the polarizing transmissive film 600 in the optical structure illustrated by FIG. 1, and will not be described here again.

In some examples, as illustrated by FIG. 2, the light-transmitting flat plate 500 includes two flat plate surfaces 501, such as a first flat plate surface 51 and a second flat plate surface 52, the first flat plate surface 51 is located between the second flat plate surface 52 and the first lens 100, the phase retardation film 300 is located on the first flat plate surface 51, and the antireflection film 700 is attached to a surface of the phase retardation film 300 away from the first flat plate surface 51. For example, the antireflection film 700 is beneficial to reduce stray light caused by reflection.

Figure 3:
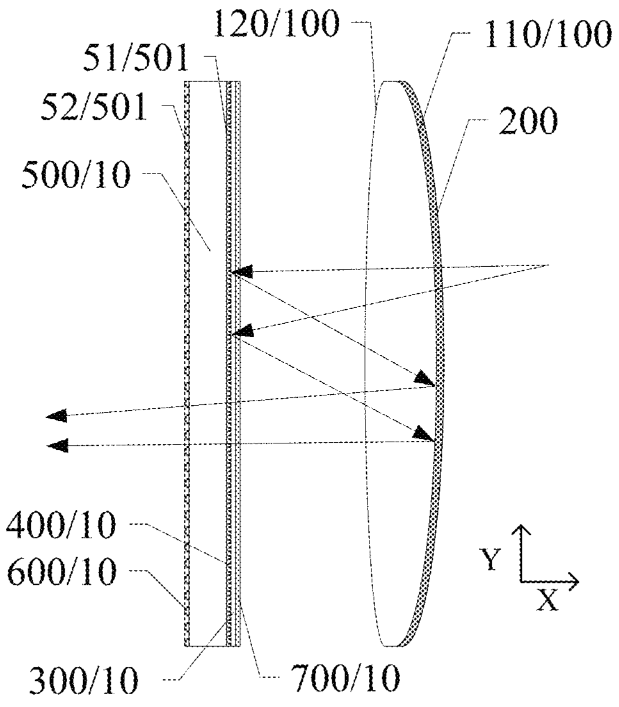

FIG. 3 is a partial structural diagram of an optical structure provided by another example of an embodiment of the present disclosure. The optical structure illustrated by FIG. 3 is different from the optical structure illustrated by FIG. 2 in that the position of the polarizing reflective film 400 is different.

The first lens 100, the transflective film 200, the light-transmitting flat plate 500, the phase retardation film 300, the polarizing reflective film 400 and the polarizing transmissive film 600 in the optical structure illustrated by FIG. 3 may have the same characteristics as the first lens 100, the transflective film 200, the light-transmitting flat plate 500, the phase retardation film 300, the polarizing reflective film 400 and the polarizing transmissive film 600 in the optical structure illustrated by FIG. 1, and will not be described here again. The antireflection film 700 in the optical structure illustrated by FIG. 3 may have the same characteristics as the antireflection film 700 in the optical structure illustrated by FIG. 2, and will not be described here again.

For example, as illustrated by FIG. 3, the polarizing reflective film 400, the phase retardation film 300 and the antireflection film 700 are all located on the first flat plate surface 51 of the light-transmitting flat plate 500, and the polarizing transmissive film 600 is located on the second flat plate surface 52 of the light-transmitting flat plate 500. For example, the polarizing reflective film 400, the phase retardation film 300 and the antireflection film 700 are all attached to the first flat plate surface 51 of the light-transmitting flat plate 500, and the polarizing transmissive film 600 is attached to the second flat plate surface 52 of the light-transmitting flat plate 500.

Figure 4:
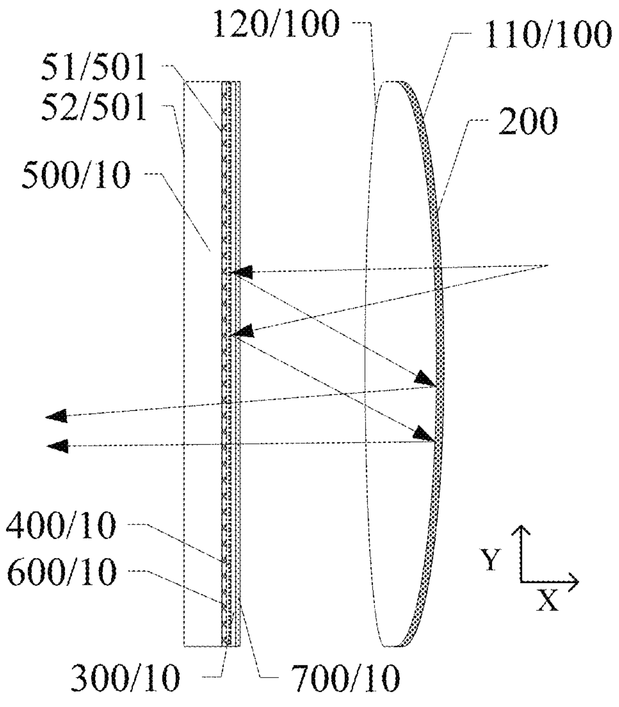

FIG. 4 is a partial structural diagram of an optical structure provided by another example of an embodiment of the present disclosure. The optical structure illustrated by FIG. 4 is different from the optical structure illustrated by FIG. 3 in that the position of the polarizing transmissive film 600 is different.

The first lens 100, the transflective film 200, the light-transmitting flat plate 500, the phase retardation film 300, the polarizing reflective film 400 and the polarizing transmissive film 600 in the optical structure illustrated by FIG. 4 may have the same characteristics as the first lens 100, the transflective film 200, the light-transmitting flat plate 500, the phase retardation film 300, the polarizing reflective film 400 and the polarizing transmissive film 600 in the optical structure illustrated by FIG. 1, and will not be described here again. The antireflection film 700 in the optical structure illustrated by FIG. 4 may have the same characteristics as the antireflection film 700 in the optical structure illustrated by FIG. 2, and will not be described here again.

In some examples, as illustrated by FIG. 4, the light-transmitting flat plate 500 includes two flat plate surfaces 501 arranged in parallel and perpendicular to the optical axis of the first lens 100, and the phase retardation film 300, the polarizing reflective film 400 and the polarizing transmissive film 600 are all located on the same flat plate surface 501.

For example, as illustrated by FIG. 4, the phase retardation film 300, the polarizing reflective film 400 and the polarizing transmissive film 600 are all located on the flat plate surface 501 of the two flat plate surfaces 501, which is close to the first lens 100, so that users can be prevented from contacting the above-mentioned films, thus protecting the above-mentioned films, and at the same time, it is beneficial to reduce the production cost by attaching all the films to the same flat plate surface.

For example, as illustrated by FIG. 4, the antireflection film 700, the phase retardation film 300, the polarizing reflective film 400 and the polarizing transmissive film 600 are all located on the first flat plate surface 51.

Figure 5:
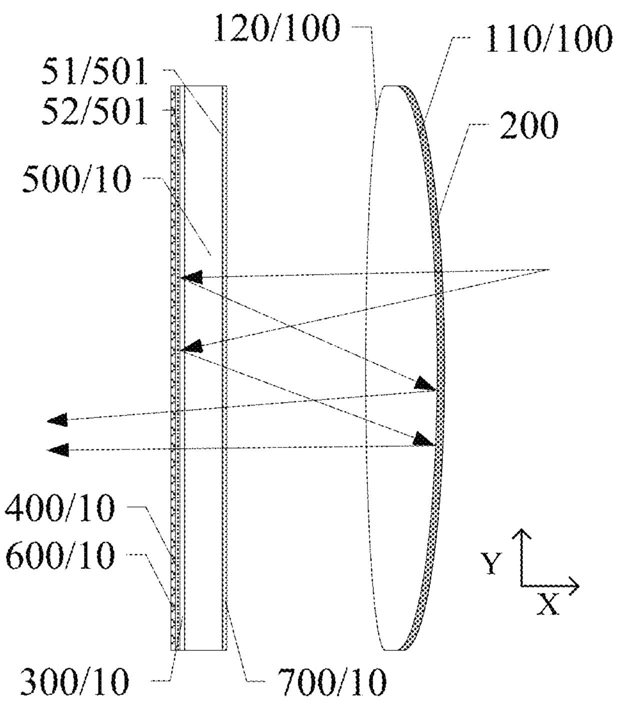

FIG. 5 is a partial structural diagram of an optical structure provided by another example of an embodiment of the present disclosure. The optical structure illustrated by FIG. 5 is different from the optical structure illustrated by FIG. 4 in that the positions of the phase retardation film 300, the polarizing reflective film 400 and the polarizing transmissive film 600 are different.

The first lens 100, the transflective film 200, the light-transmitting flat plate 500, the phase retardation film 300, the polarizing reflective film 400 and the polarizing transmissive film 600 in the optical structure illustrated by FIG. 5 may have the same characteristics as the first lens 100, the transflective film 200, the light-transmitting flat plate 500, the phase retardation film 300, the polarizing reflective film 400 and the polarizing transmissive film 600 in the optical structure illustrated by FIG. 1, and will not be described here again. The antireflection film 700 in the optical structure illustrated by FIG. 5 may have the same characteristics as the antireflection film 700 in the optical structure illustrated by FIG. 2, and will not be described here again.

In some examples, as illustrated by FIG. 5, the phase retardation film 300, the polarizing reflective film 400 and the polarizing transmissive film 600 are all located on the flat plate surface 501 of the two flat plate surfaces 501 of the light-transmitting flat plate 500, which is away from the first lens 100, such as the second flat plate surface 52. For example, the antireflection film 700 is located on the first flat plate surface 51. For example, in the case that the glass material is selected for the light-transmitting flat plate 500, the antireflection film 700 with better effect can be plated on the glass because the glass material is more tolerant to a high temperature during processing, which is beneficial to reduce stray light caused by reflection.

In the example illustrated by FIG. 1 to FIG. 5, the light-transmitting flat plate is a flat plate structure, the flat plate structure includes two flat plate surfaces opposite to each other and perpendicular to the optical axis of the first lens. Both the flat plate surfaces are hard planes, and the phase retardation film, the polarizing reflective film, the polarizing transmissive film and the antireflection film are attached to at least one of the two flat plate surfaces.

FIGS. 6 to 13 are partial structural schematic diagrams of optical structures provided by different examples of embodiments of the present disclosure. The first lens 100, the transflective film 200, the phase retardation film 300, the polarizing reflective film 400 and the polarizing transmissive film 600 in the optical structure illustrated by FIGS. 6 to 13 may have the same characteristics as the first lens 100, the transflective film 200, the phase retardation film 300, the polarizing reflective film 400 and the polarizing transmissive film 600 in the optical structure illustrated by FIG. 1, and will not be described here again.

In some examples, as illustrated by FIGS. 6 to 12, the light-transmitting flat plate 500 includes a plurality of sub-flat plates arranged along a direction parallel to the optical axis of the first lens 100, that is to say, the X direction, and each sub-flat plate includes two flat plate surfaces 501 arranged in parallel and perpendicular to the optical axis of the first lens 100; the phase retardation film 300, the polarizing reflective film 400 and the polarizing transmissive film 600 are all located in intervals between the plurality of sub-flat plates, or at least one selected from the group consisting of the phase retardation film 300, the polarizing reflective film 400 and the polarizing transmissive film 600 is located on the flat plate surface 501, close to the first lens 100, of the sub-flat plate closest to the first lens 100.

For example, as illustrated by FIGS. 6 to 12, thicknesses of the plurality of sub-flat plates are the same. Of course, the embodiment of the present disclosure is not limited thereto, and the thickness of at least one sub-flat plate can be set to be different from that of other sub-flat plate according to product requirements.

For example, as illustrated by FIG. 6 to FIG. 12, a sealing film material 502 is arranged at the interval between adjacent sub-flat plates to seal the film layer, such as at least one of the phase retardation film 300, the polarizing reflective film 400 and the polarizing transmissive film 600, in the adjacent sub-flat plates. For example, the sealing film material 502 can further play the role of bonding adjacent sub-flat plates.

According to the optical structure provided by the present disclosure, by setting the optical flat plate to include the plurality of sub-flat plates, and setting the positions of the phase retardation film, the polarizing transmissive film and the polarizing reflective film, users can not touch any of the above-mentioned film layers, so as to protect the above-mentioned film layers. In addition, at least part of the above-mentioned film layers are arranged in the intervals between the plurality of sub-flat plates, which can prevent the film layers from being exposed to an external environment and further protect the film layers.

Of course, the embodiment of the present disclosure is not limited thereto, and at least one selected from the group consisting of the phase retardation film, the polarizing reflective film and the polarizing transmissive film may also be located on the flat plate surface, away from the first lens 100, of the sub-flat plate farthest from the first lens.

In the example illustrated by FIG. 6 to FIG. 12, the light-transmitting flat plate includes at least two sub-flat plates, and the light-transmitting flat plate includes at least four flat plate surfaces perpendicular to the optical axis of the first lens, and each flat plate surface is a surface where the sub-flat plate contact with other medium, and other medium may include the above-mentioned phase retardation film, polarizing reflective film, the polarizing transmissive film, antireflection film, other material layers or air.

Figure 6:
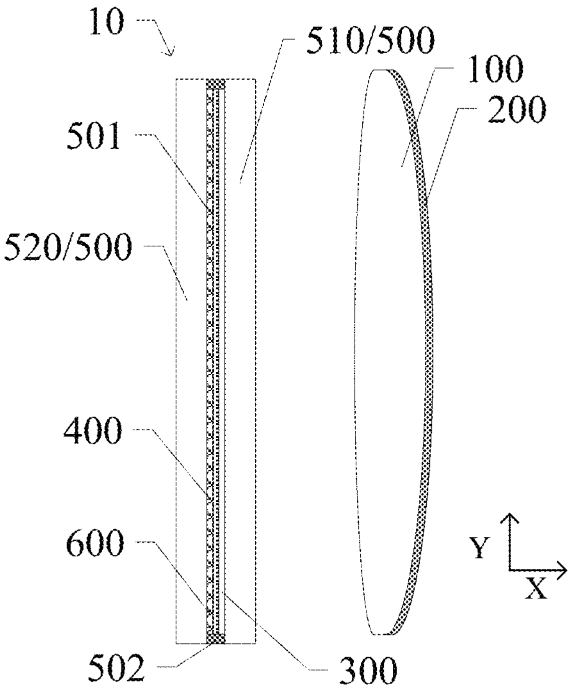
FIGS. 6 to 13 are partial structural schematic diagrams of optical structures provided by different examples of embodiments of the present disclosure.
Figure 7:
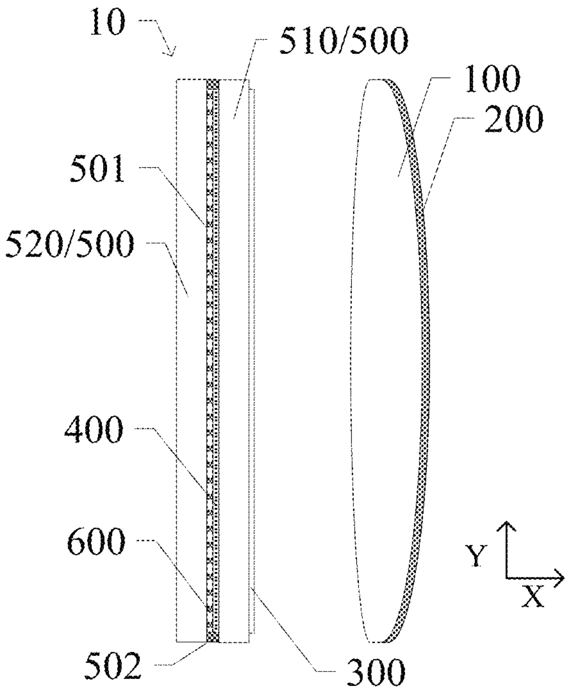
Figure 8:
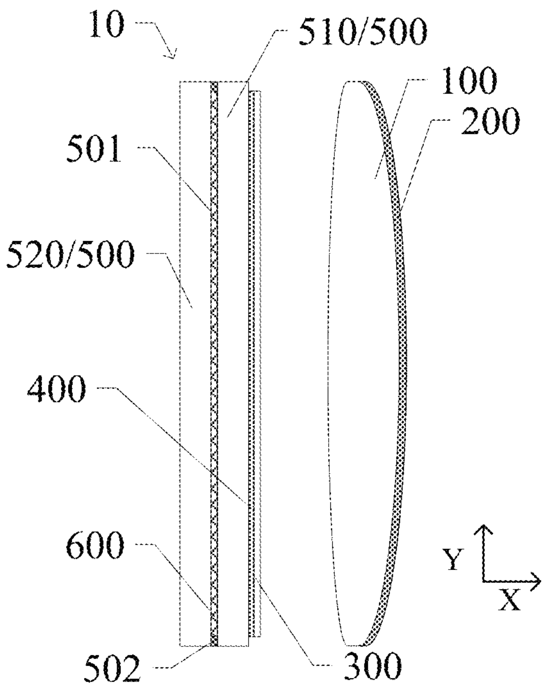

In some examples, as illustrated by FIGS. 6 to 8, the plurality of sub-flat plates include a first sub-flat plate 510 and a second sub-flat plate 520, the first sub-flat plate 510 is located between the second sub-flat plate 520 and the first lens 100, and the phase retardation film 300, the polarizing reflective film 400 and the polarizing transmissive film 600 are all located between the first sub-flat plate 510 and the second sub-flat plate 520, or the phase retardation film 300 is located on the flat plate surface 501 of the first sub-flat plate 510 facing the first lens 100, and the polarizing transmissive film 600 is located between the first sub-flat plate 510 and the second sub-flat plate 520.

For example, as illustrated by FIG. 6, the phase retardation film 300 is attached to the flat plate surface 501 of the first sub-flat plate 510 away from the first lens 100, and both the polarizing reflective film 400 and the polarizing transmissive film 600 are attached to the flat plate surface 501 of the second sub-flat plate 520 facing the first sub-flat plate 510, and then the first sub-flat plate 510 and the second sub-flat plate 520 are hermetically bonded, such as the phase retardation film 300, the polarizing reflective film 400 and the polarizing transmissive film 600 are all located in the light-transmitting flat plate 500. In this example, the phase retardation film, the polarizing reflective film and the polarizing transmissive film are all arranged between the first sub-flat plate and the second sub-flat plate, so that the phase retardation film, the polarizing reflective film and the polarizing transmissive film can be protected.

For example, as illustrated by FIG. 7, both the polarizing transmissive film 600 and the polarizing reflective film 400 are located between the first sub-flat plate 510 and the second sub-flat plate 520, and the phase retardation film 300 and the polarizing reflective film 400 are attached to two different flat plate surfaces 501 of the light-transmitting flat plate 500, such as two flat plate surfaces of two sub-flat plates, or two different flat plate surfaces of the same sub-flat plate, so as to protect the polarizing transmissive film and the polarizing reflective film, and at the same time, it is beneficial to reduce stray light and ghost.

For example, as illustrated by FIG. 8, the polarizing reflective film 400 and the phase retardation film 300 are both located on the flat plate surface 501 of the first sub-flat plate 510 facing the first lens 100, and the polarization transmissive film 600 is located between the first sub-flat plate 510 and the second sub-flat plate 520.

Figure 9:
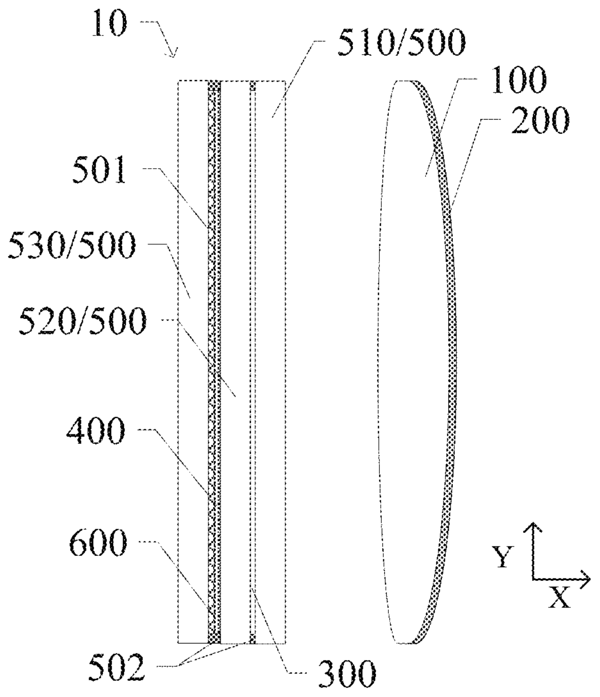
Figure 10:
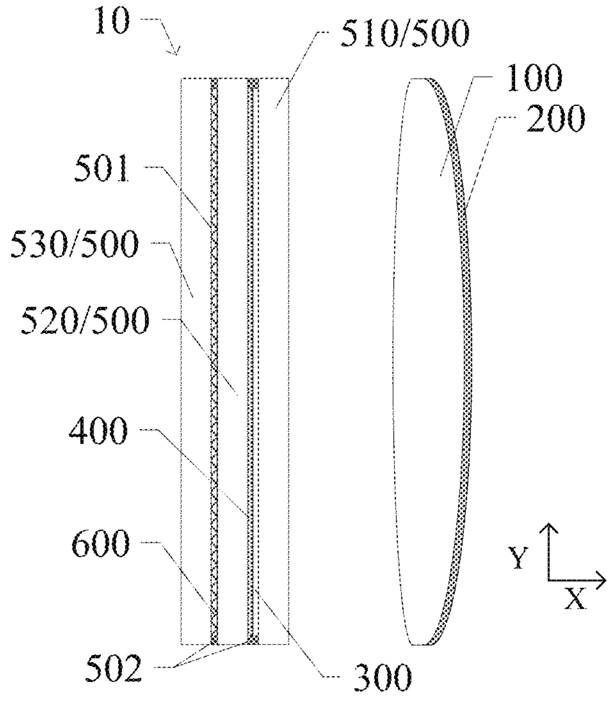
Figure 11:
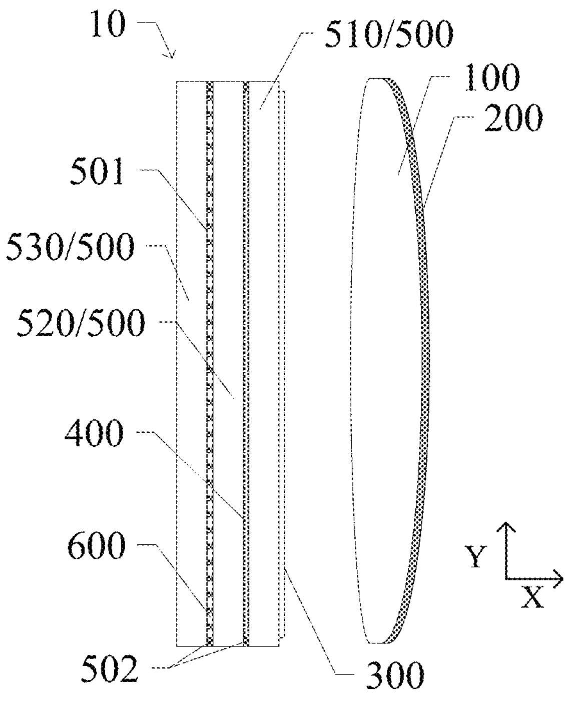

In some examples, as illustrated by FIGS. 9 to 11, the plurality of sub-flat plates include a first sub-flat plate 510, a second sub-flat plate 520 and a third sub-flat plate 530, which are sequentially arranged. The first sub-flat plate 510 is located between the second sub-flat plate 520 and the first lens 100, and the phase retardation film 300, the polarizing reflective film 400 and the polarizing transmissive film 600 are located in the intervals between the first sub-flat plate 510, the second sub-flat plate 520 and the third sub-flat plate 5; or the phase retardation film 300 is located on the flat plate surface 501 of the first sub-flat plate 510 facing the first lens 100, the polarizing reflective film 400 is located between the first sub-flat plate 510 and the second sub-flat plate 520, and the polarizing transmissive film 600 is located between the second sub-flat plate 520 and the third sub-flat plate 530.

For example, as illustrated by FIG. 9, the phase retardation film 300 is located between the first sub-flat plate 510 and the second sub-flat plate 520, and the polarizing reflective film 400 and the polarizing transmissive film 600 are both located between the second sub-flat plate 520 and the third sub-flat plate 530. By arranging the phase retardation film, the polarizing reflective film and the polarizing transmissive film only in the intervals of the sub-flat plates, at the same time, the phase retardation film and the polarizing reflective film are respectively attached to the flat plate surfaces of different sub-flat plates, or different flat plate surfaces of the same sub-flat plate, so as to protect the phase retardation film, the polarizing transmissive film and the polarizing reflective film, improve the attachment flatness of the phase retardation film, the polarizing reflective film and the polarizing transmissive film, and help reduce stray light and ghost.

For example, as illustrated by FIG. 9, the sealing film material 502 for sealing the phase retardation film 300 is arranged between the first sub-flat plate 510 and the second sub-flat plate 520, and the sealing film material 502 for sealing the polarizing reflective film 400 and the polarizing transmissive film 600 is arranged between the second sub-flat plate 520 and the third sub-flat plate 530.

For example, as illustrated by FIG. 10, both the phase retardation film 300 and the polarizing reflective film 400 are located between the first sub-flat plate 510 and the second sub-flat plate 520, and the polarizing transmissive film 600 is located between the second sub-flat plate 520 and the third sub-flat plate 530. By arranging the phase retardation film, the polarizing reflective film and the polarizing transmissive film in the intervals between the plurality of sub-flat plates of the light-transmitting flat plate, the phase retardation film, the polarizing transmissive film and the polarizing reflective film are protected, and the attachment flatness of the phase retardation film, the polarizing reflective film and the polarizing transmissive film is improved.

For example, as illustrated by FIG. 10, the sealing film material 502 sealing the phase retardation film 300 and the polarizing reflective film 400 is arranged between the first sub-flat plate 510 and the second sub-flat plate 520, and the sealing film material 502 sealing the polarizing transmissive film 600 is arranged between the second sub-flat plate 520 and the third sub-flat plate 530.

For example, as illustrated by FIG. 11, the polarizing reflective film 400 and the polarizing transmissive film 600 are arranged in different intervals between the plurality of sub-flat plates included in the light-transmitting flat plate 500, and the phase retardation film 300 and the polarizing reflective film 400 are attached to the flat plate surfaces 501 on both sides of the first sub-flat plate 510, so as to protect the polarizing transmissive film and the polarizing reflective film and improve the attachment flatness of the phase retardation film, the polarizing reflective film and the polarizing transmissive film, and at the same time, it is beneficial to reduce stray light and ghost.

For example, as illustrated by FIG. 11, the sealing film material 502 sealing the polarizing reflective film 400 is arranged between the first sub-flat plate 510 and the second sub-flat plate 520, and the sealing film material 502 sealing the polarizing transmissive film 600 is arranged between the second sub-flat plate 520 and the third sub-flat plate 530.

Figure 12:
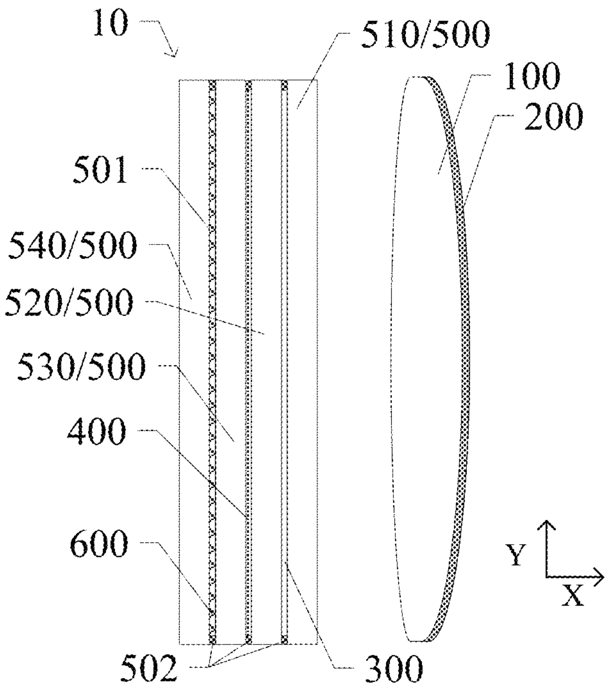

In some examples, as illustrated by FIG. 12, the plurality of sub-flat plates include four sub-flat plates arranged in sequence, such as a first sub-flat plate 510, a second sub-flat plate 520, a third sub-flat plate 530 and a fourth sub-flat plate 540, and the phase retardation film 300, the polarizing reflective film 400 and the polarizing transmissive film 600 are respectively arranged between two adjacent sub-flat plates.

For example, as illustrated by FIG. 12, the phase retardation film 300 is located between the first sub-flat plate 510 and the second sub-flat plate 520, the polarizing reflective film 400 is located between the second sub-flat plate 520 and the third sub-flat plate 530, and the polarizing transmissive film 600 is located between the third sub-flat plate 530 and the fourth sub-flat plate 540. By arranging the phase retardation film, the polarizing reflective film and the polarizing transmissive film in the light-transmitting flat plate, the phase retardation film and the polarizing reflective film are respectively attached to the flat plate surfaces of different sub-flat plates, so as to protect the phase retardation film, the polarizing transmissive film and the polarizing reflective film, improve the attachment smoothness of the phase retardation film, the polarizing reflective film and the polarizing transmissive film, and help reduce stray light and ghost.

For example, as illustrated by FIG. 12, the sealing film material 502 for sealing the phase retardation film 300 is arranged between the first sub-flat plate 510 and the second sub-flat plate 520, the sealing film material 502 for sealing the polarizing reflective film 400 is arranged between the second sub-flat plate 520 and the third sub-flat plate 530, and the sealing film material 502 for sealing the polarizing transmissive film 600 is arranged between the third sub-flat plate 530 and the fourth sub-flat plate 540.

For example, as illustrated by FIGS. 6 to 12, the flat plate surface 501 located between adjacent sub-flat plates can be regarded as an inner surface of the light-transmitting flat plate 500, and the flat plate surface 501 of the sub-flat plate closest to the first lens 100 and the flat plate surface 501 of the sub-flat plate farthest from the first lens 100 can be regarded as outer surfaces of the light-transmitting flat plate 500.

For example, in the flat plate light-transmitting module 10 illustrated by FIGS. 6, 9, 10 and 12, the antireflection film illustrated by FIG. 2 may be further provided on the flat plate surface 501, close to the first lens 100, of the sub-flat plate closest to the first lens 100.

For example, in the flat plate light-transmitting module 10 illustrated by FIGS. 7, 8 and 11, a surface of the phase retardation film 300 close to the first lens 100 may be attached with the antireflection film illustrated by FIG. 2.

Figure 13:
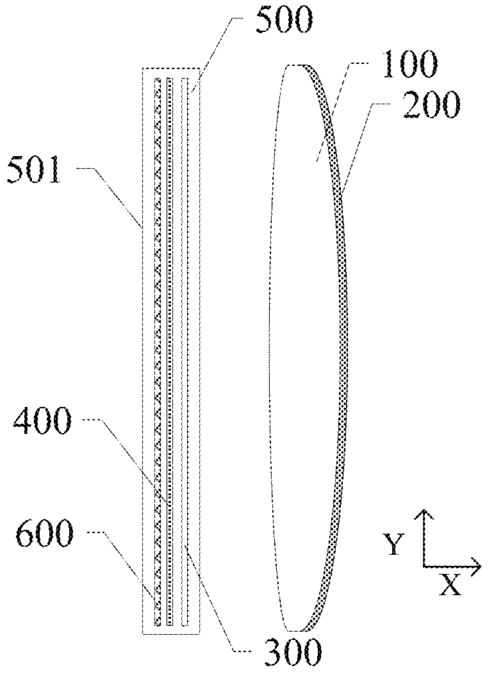

In some examples, as illustrated by FIG. 13, the phase retardation film 300, the polarizing reflective film 400 and the polarizing transmissive film 600 are all arranged inside the light-transmitting flat plate 500, and a portion of the light-transmitting flat plate 500 at a side of the phase retardation film 300 away from the polarizing reflective film 400 and a portion of the light-transmitting flat plate 500 at a side of the polarizing transmissive film 600 away from the phase retardation film 300 are arranged as an integrated structure. By arranging the phase retardation film, the polarizing reflective film and the polarizing transmissive film in the light-transmitting flat plate, the exposure of the films to the external environment can be avoided, and the film can be protected.

For example, as illustrated by FIG. 13, the light-transmitting flat plate 500 is an integral structure, and the phase retardation film 300, the polarizing reflective film 400 and the polarizing transmissive film 600 can be enclosed in the light-transmitting flat plate 500 during injection molding.

For example, as illustrated by FIG. 13, a distance between the phase retardation film 300 and the polarizing reflective film 400 in the light-transmitting flat plate 500 can be in a range from 0 to 2 mm, and a distance between the polarizing reflective film 400 and the polarizing transmissive film 600 in the light-transmitting flat plate 500 can be in a range from 0 to 2 mm.

For example, as illustrated by FIG. 13, the phase retardation film 300 and the polarizing reflective film 400 may be attached to each other or arranged at intervals, and the material of the light-transmitting flat plate 500 may be arranged between the phase retardation film 300 and the polarizing reflective film 400. For example, the polarizing reflective film 400 and the polarizing transmissive film 600 may be attached to each other, or they may be arranged at intervals, and the material of the light-transmitting flat plate 500 may be arranged between the polarizing reflective film 400 and the polarizing transmissive film 600. For example, the phase retardation film 300 may be attached to an inner surface of the light-transmitting flat plate 500 close to the first lens 100. For example, the polarizing transmissive film 600 may be attached to an inner surface of the light-transmitting flat plate 500 away from the first lens 100.

For example, as illustrated by FIG. 13, the phase retardation film 300, the polarizing reflective film 400 and the polarizing transmissive film 600 located in the light-transmitting flat plate 500 can be arranged at equal intervals, but it is not limited thereto. For example, the distance between the phase retardation film 300 and the polarizing reflective film 400 can be greater than the distance between the polarizing reflective film 400 and the polarizing transmissive film 600, or the distance between the phase retardation film 300 and the polarizing reflective film 400 can be smaller than the distance between the polarizing reflective film 400 and the polarizing transmissive film 600.

In some examples, as illustrated by FIGS. 1 to 13, a focal length of the optical structure is in a range from 5 to 100 mm. For example, the focal length of the optical structure is in a range from 10 to 90 mm. For example. The focal length of the optical structure is in a range from 15 to 80 mm. For example, the focal length of the optical structure is in a range from 20 to 50 mm. For example, the focal length of the optical structure is in a range from 25 to 60 mm. For example, the focal length of the optical structure is in a range from 18 to 30 mm.

For example, as illustrated by FIGS. 1 to 13, a focal length of the first lens 100 is in a range from 5 to 500 mm. The focal length of the first lens 100 refers to the focal length in the case that the surface of the first lens 100 is not coated. For example, the focal length of the first lens 100 may be in a range from 10 to 450 mm. For example, the focal length of the first lens 100 may be in a range from 50 to 400 mm. For example, the focal length of the first lens 100 may be in a range from 60 to 300 mm.

By arranging the transflective film and the light-transmitting flat plate assembly in the optical structure, compared with the structure including only the first lens, the focal length of the optical structure can be reduced, which is beneficial to reducing the size, such as thickness, of the optical structure, so as to improve the compactness of the display device including the optical structure.

In some examples, as illustrated by FIGS. 1 to 13, in the direction parallel to the optical axis of the first lens 100, a maximum thickness of the first lens 100 is in a range from 1 to 10 mm, a thickness of the light-transmitting flat plate 500 is in a range from 0.1 to 5 mm, and a distance between the first lens 100 and the light-transmitting flat plate 500 is in a range from 0.5 to 100 mm.

The maximum thickness of the first lens 100 may mean that a distance between an intersection point of the first surface 110 and the optical axis and an intersection point of the second surface 120 and the optical axis is in a range from 1 to 10 mm, for example, a dimension of the first lens 100 cut by its optical axis is in a range from 1 to 10 mm. Dimensions of respective positions of the light-transmitting flat plate 500 in a direction parallel to the optical axis are basically the same, for example, a dimension of the light-transmitting flat plate 500 cut by the optical axis of the first lens 100 is in a range from 0.1 to 5 mm. The distance between the first lens 100 and the light-transmitting flat plate 500 may refer to the distance between an intersection point of the second surface 120 and the optical axis and an intersection point of the surface of the light-transmitting flat plate 500 close to the first lens 100 and the optical axis.

For example, as illustrated by FIGS. 1 to 13, along the direction parallel to the optical axis of the first lens 100, the maximum thickness of the first lens 100 is in a range from 2 to 8 mm, the thickness of the light-transmitting flat plate 500 is in a range from 0.5 to 4.5 mm, and the distance between the first lens 100 and the light-transmitting flat plate 500 is in a range from 1 to 80 mm. For example, along the direction parallel to the optical axis of the first lens 100, the maximum thickness of the first lens 100 is in a range from 3 to 6 mm, the thickness of the light-transmitting flat plate 500 is in a range from 1 to 3 mm, and the distance between the first lens 100 and the light-transmitting flat plate 500 is in a range from 10 to 60 mm. For example, along the direction parallel to the optical axis of the first lens 100, the maximum thickness of the first lens 100 is in a range from 4 to 7 mm, the thickness of the light-transmitting flat plate 500 is in a range from 2 to 4 mm, and the distance between the first lens 100 and the light-transmitting flat plate 500 is in a range from 15 to 70 mm.

For example, as illustrated by FIG. 1, the first lens 100 is an aspherical monolithic lens, and a curvature of the first surface 110 can be in a range from −1 to 1, and a curvature of the second surface 120 can be in a range from −10 to 10.

Figure 14:
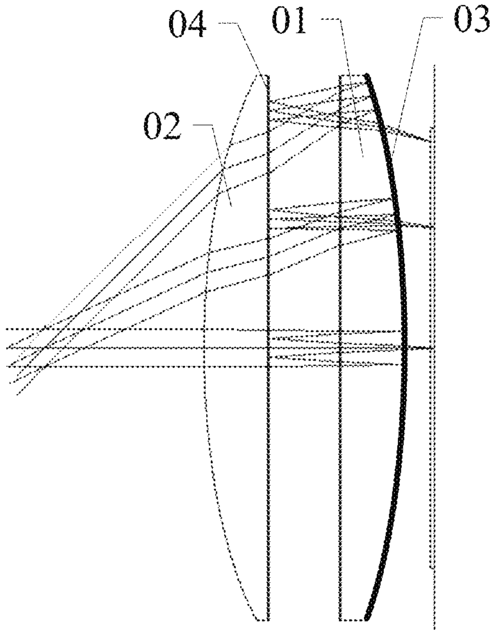
FIG. 14 is a schematic diagram of an optical structure.
Figure 15:
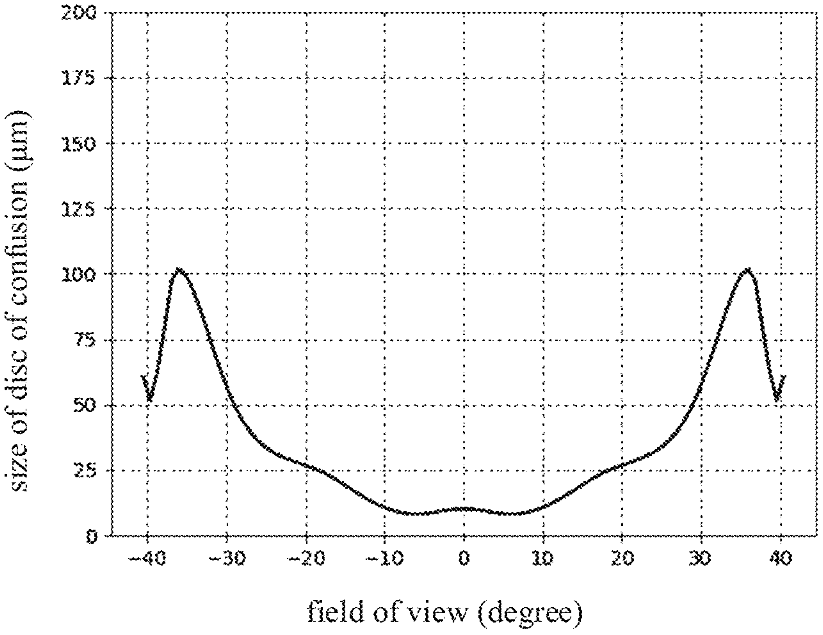
FIG. 15 is a curve chart showing a variation of a size of disc of confusion of the optical structure illustrated by FIG. 14 with field of view.
Figure 16:
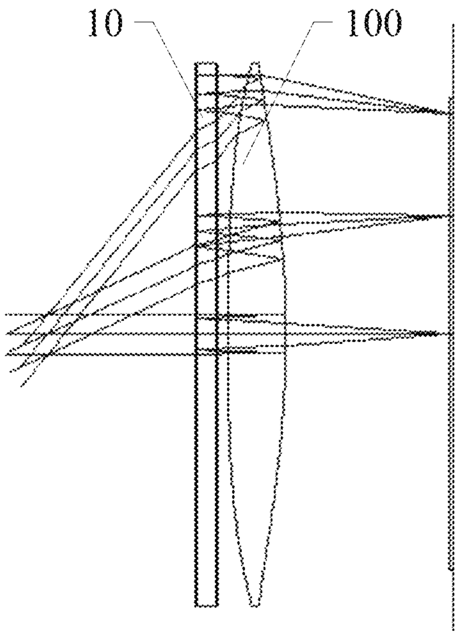
FIG. 16 is an optical structure illustrated by any one of the examples from FIG. 1 to FIG. 13.
Figure 17:
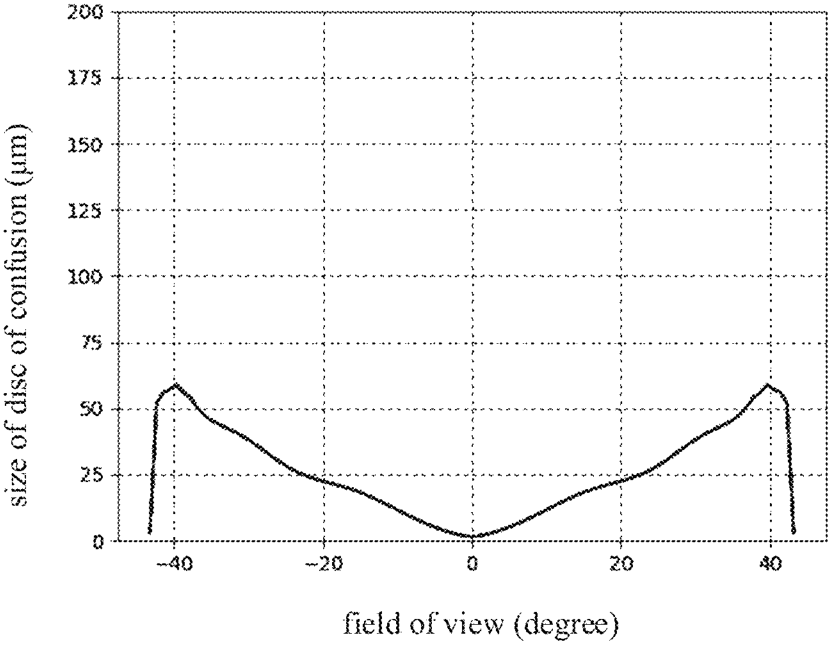
FIG. 17 is a curve chart showing a variation of a size of disc of confusion of the optical structure illustrated by FIG. 16 with field of view.

FIG. 14 is a schematic diagram of an optical structure, and FIG. 15 is a curve chart showing a variation of a size of disc of confusion of the optical structure illustrated by FIG. 14 with field of view. FIG. 16 is an optical structure illustrated by any one of the examples from FIG. 1 to FIG. 13, and FIG. 17 is a curve chart showing a variation of a size of disc of confusion of the optical structure illustrated by FIG. 16 with field of view.

In the research, the inventors of the present application have found that the optical structure illustrated by FIG. 14 includes lens 01 and lens 02, each of the lens includes two surfaces that are curved surface and plane surface respectively, and the surfaces, having planar shape, of the lens 01 and lens 02 are arranged close to each other, a transflective film 03 is arranged on the curved surface of the lens 01 and a polarizing reflective film 04 is arranged on the plane surface of the other lens 02.

Compared with the dual-lens optical structure illustrated by FIG. 14, in the optical structure provided by the present disclosure, only one single lens with two effective optical curved surfaces, such as aspheric surface or spherical surface, that is to say, the first lens, is adopted, and at the same time, the phase retardation film and the polarizing reflective film are arranged on the flat plate surface of or inside the light-transmitting flat plate, while the comprehensive performance such as definition and field of view angle is equivalent to the optical performance of the dual-lens optical structure illustrated by FIG. 14, the cost of the optical structure provided by the present disclosure is greatly reduced. For example, the cost of the optical structure provided by the present disclosure can be reduced by nearly 50% compared with the cost of the optical structure illustrated by FIG. 14. At the same time, the light-transmitting flat plate in the optical structure provided by the present disclosure can be processed by various schemes, such as cold working, so as to further control the cost of the optical structure.

As illustrated by FIG. 14 to FIG. 17, a size of disc of confusion of the optical structure illustrated by FIG. 14 is equivalent to a size of disc of confusion of the optical structure provided in the present disclosure in the field of view angle in a range of −40 to 40 degrees, and the size of the disc of confusion of the optical structure provided in the present disclosure in the field of view angle of 0 and in a range of 30 to 40 degrees is smaller than the size of the disc of confusion of the optical structure illustrated by FIG. 14 at a corresponding field of view angle. Therefore, when the optical structure provided by the present disclosure is applied to a display device, the image definition is higher.

In some examples, as illustrated by FIGS. 1 to 13, the material of the light-transmitting flat plate 500 includes glass or plastic.

The light-transmitting flat plate provided by the embodiment of the present disclosure can be made of a glass material, such as optical glass. Compared with a few optical plastics, a refractive index and dispersion characteristics of optical glass can be selected in a larger range. For example, the refractive index of optical glass can be in a range of 1.4 to 2.2, and a dispersion abbe number of optical glass can be in a range of 20 to 90. By flexibly selecting the glass material, a certain dispersion compensation function can be realized, which is beneficial to the display device with the optical structure to have better display performance.

The light-transmitting flat plate provided by the present disclosure includes at least two flat plate surface for attaching the film required by the pancake scheme, and the degree of freedom for attaching the film is high, which is beneficial to systematic optimization in terms of performance, film cost, manufacturing process.

FIGS. 18 to 21 are schematic diagrams of optical structures illustrated by different examples according to embodiments of the present disclosure.

The first lens 100, the transflective film 200 and the light-transmitting flat plate assembly 10 in the optical structure illustrated by FIGS. 18 to 21 may have the same characteristics as the first lens 100, the transflective film 200 and the light-transmitting flat plate assembly 10 in any example of FIGS. 1 to 13, and will not be described here again.

In some examples, as illustrated by FIGS. 18 to 21, the optical structure further includes a second lens 800, the second lens 800 includes a third surface 810 and a fourth surface 820, and at least one of the third surface 810 and the fourth surface 820 is a non-planar surface.

Figure 18:
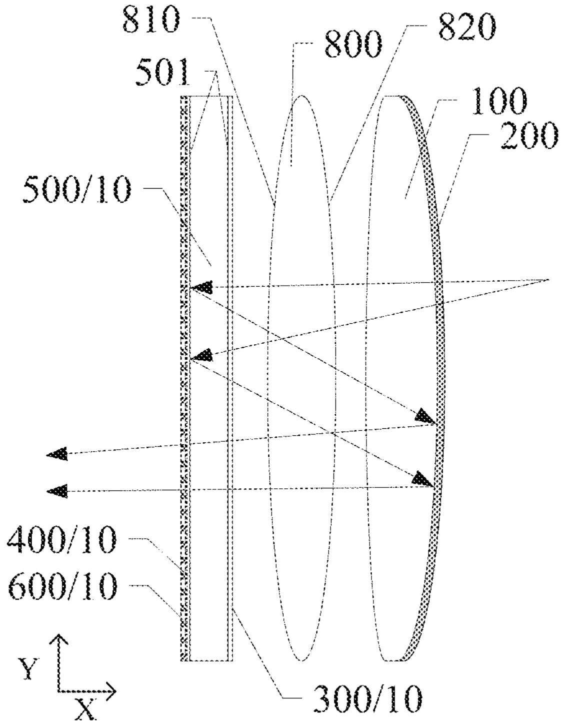
FIGS. 18 to 21 are schematic diagrams of optical structures illustrated by different examples according to embodiments of the present disclosure.
Figure 19:
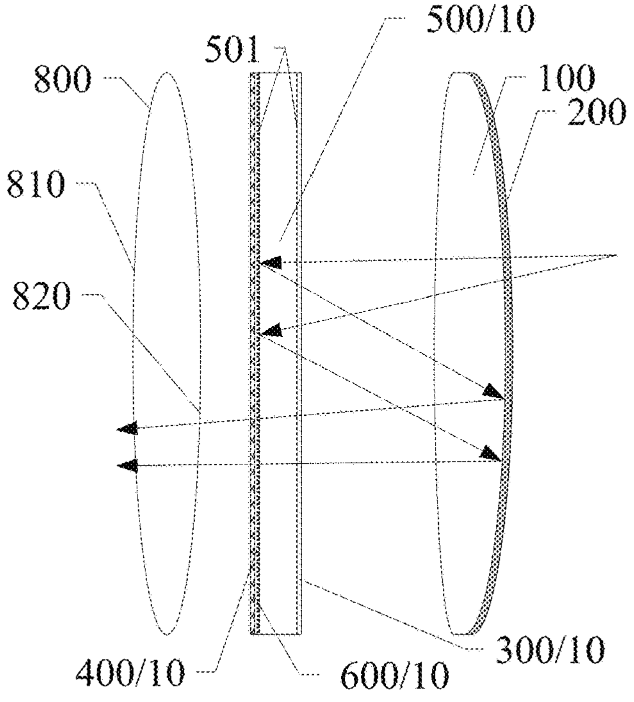

For example, as illustrated by FIGS. 18 and 19, the third surface 810 and the fourth surface 820 are both non-planar surfaces. For example, at least one of the third surface 810 and the fourth surface 820 is spherical surface, aspherical surface or free-form surface.

Figure 20:
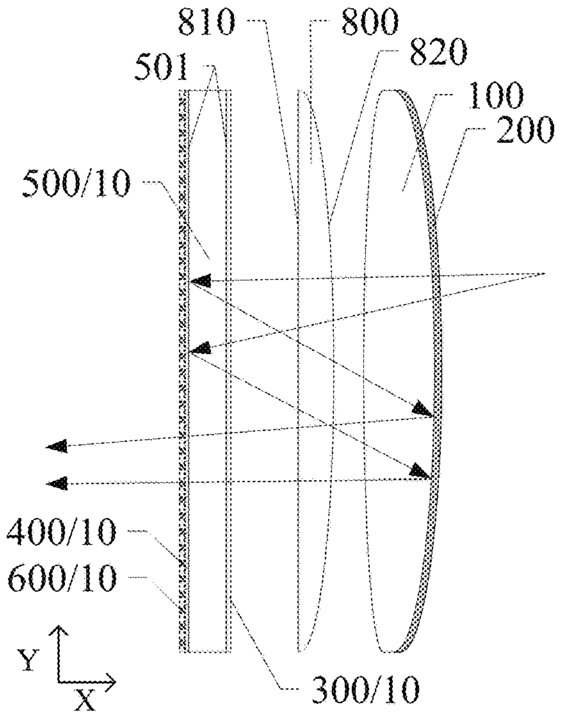
Figure 21:
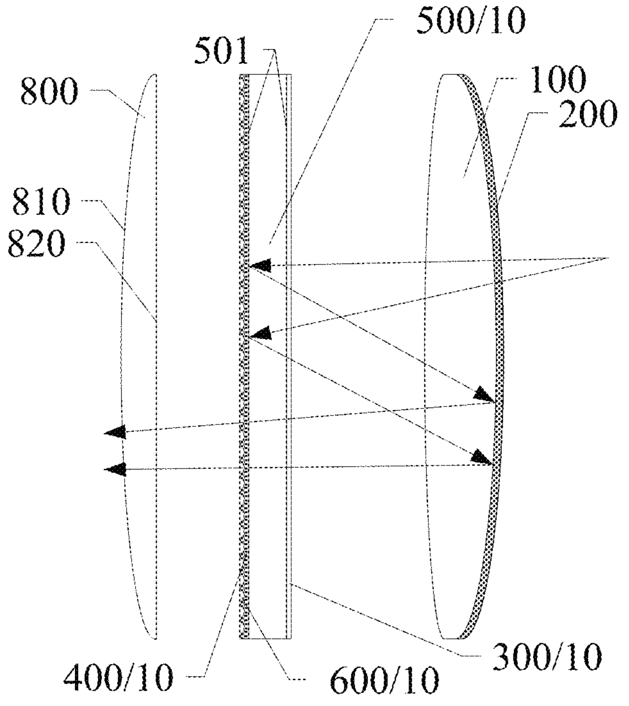

For example, as illustrated by FIGS. 20 and 21, one of the third surface 810 and the fourth surface 820, which is away from the light-transmitting flat plate assembly 10, is a non-planar surface, and one of the third surface 810 and the fourth surface 820, which is close to the light-transmitting flat plate assembly 10, is a plane surface. For example, one of the third surface 810 and the fourth surface 820, which is away from the light-transmitting flat plate assembly 10, is spherical surface, aspherical surface or free-form surface.

In some examples, as illustrated by FIGS. 18 to 21, the second lens 800 is located between the first lens 100 and the light-transmitting flat plate assembly 10, or the second lens 800 is located at a side of the light-transmitting flat plate assembly 10 away from the first lens 100.

According to the optical structure provided by the embodiment of the present disclosure, by including two lens and one light-transmitting flat plate assembly, at least three optical curved surfaces are arranged to improve the design freedom, and at the same time, the phase retardation film, the polarizing reflective film and the polarizing transmissive film are arranged on the flat plate surface of or in the light-transmitting flat plate, which is beneficial to improving the optical performance of the optical structure.

Figure 22:
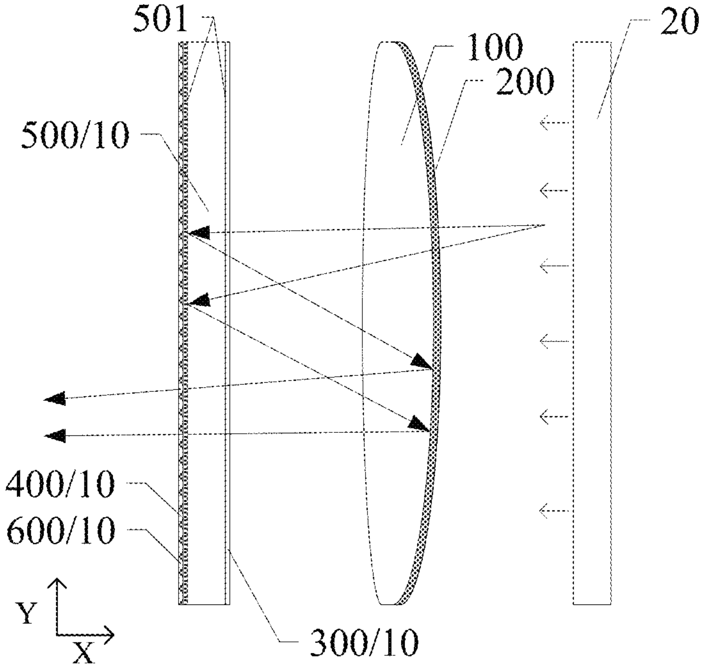
FIG. 22 is a partial structural diagram of a display device provided by another embodiment of the present disclosure.

FIG. 22 is a partial structural diagram of a display device provided by another embodiment of the present disclosure. As illustrated by FIG. 22, the display device includes a display screen 20 and the optical structure illustrated by any of the above embodiments. The display screen 20 is located at a side of the first lens 100 away from the light-transmitting flat plate assembly 10.

For example, as illustrated by FIG. 22, a display surface of the display screen 20 is located at a focal plane of a light incident side of the optical structure.

For example, the display screen 20 can be any type of display screen such as a liquid crystal display screen, an organic light emitting diode display screen, an inorganic light emitting diode display screen, a quantum dot display screen, a projector (such as an LCOS micro projector), and the like.

For example, the display device may be a virtual reality (VR) display device. For example, the virtual reality display device can be a display device using an ultra-short focal folded optical path.

For example, the display device may be a near-eye display device, which may be a wearable VR helmet, VR glasses, etc., and embodiments of the present disclosure are not limited thereto.

The following points should be noted:

(1) Only the structures relevant to the embodiments of the present disclosure are involved in the accompanying drawings of the embodiments of the present disclosure, and other structures may refer to the conventional design.

(2) The features in the same or different embodiments of the disclosure may be mutually combined without conflict.

The foregoing are merely exemplary embodiments of the invention, but is not used to limit the protection scope of the disclosure. The protection scope of the disclosure shall be defined by the attached claims.

The invention claimed is:

1. An optical structure, comprising:

a first lens, comprising a first surface and a second surface, wherein both the first surface and the second surface are non-planar surfaces;

a transflective film, located at a side of the first surface away from the second surface, wherein the optical structure further comprises a light-transmitting flat plate assembly located at a side of the second surface away from the first surface, and the light-transmitting flat plate assembly comprises a light-transmitting flat plate, a phase retardation film and a polarizing reflective film, the polarizing reflective film is located at a side of the phase retardation film away from the first lens, and both the phase retardation film and the polarizing reflective film are located on a flat plate surface of the light-transmitting flat plate or inside the light-transmitting flat plate;

the light-transmitting flat plate assembly further comprises a polarizing transmissive film, the polarizing transmissive film is located at a side of the polarizing reflective film away from the phase retardation film, and the polarizing transmissive film is located on the flat plate surface of the light-transmitting flat plate or inside the light-transmitting flat plate;

the light-transmitting flat plat comprises a plurality of sub-flat plates arranged along a direction parallel to an optical axis of the first lens, and each of the plurality of sub-flat plates comprises two flat plate surfaces arranged in parallel and perpendicular to the optical axis of the first lens;

the phase retardation film, the polarizing reflective film and the polarizing transmissive film are all located in intervals between the plurality of sub-flat plates.

2. The optical structure according to claim 1, wherein the light-transmitting flat plate comprises at least two flat plate surfaces arranged in parallel and perpendicular to an optical axis of the first lens, the phase retardation film and the polarizing reflective film are located on different flat plate surfaces, and the at least two flat plate surfaces are both planes.

3. The optical structure according to claim 1, wherein the plurality of sub-flat plates comprise a first sub-flat plate and a second sub-flat plate, the first sub-flat plate is located between the second sub-flat plate and the first lens, and the phase retardation film, the polarizing reflective film and the polarizing transmissive film are all located between the first sub-flat plate and the second sub-flat plate.

4. The optical structure according to claim 1, wherein the plurality of sub-flat plates comprise a first sub-flat plate, a second sub-flat plate and a third sub-flat plate sequentially arranged, the first sub-flat plate is located between the second sub-flat plate and the first lens, and the phase retardation film, the polarizing reflective film and the polarizing transmissive film are located in the intervals between the first sub-flat plate, the second sub-flat plate and the third sub-flat plate.

5. The optical structure according to claim 1, wherein the plurality of sub-flat plates comprise four sub-flat plates sequentially arranged, and the phase retardation film, the polarizing reflective film and the polarizing transmissive film are respectively arranged between two adjacent sub-flat plates.

6. The optical structure according to claim 1, wherein a focal length of the optical structure is in a range from 5 to 100 mm.

7. The optical structure according to claim 6, wherein, in a direction parallel to an optical axis of the first lens, a maximum thickness of the first lens is in a range from 1 to 10 mm, a thickness of the light-transmitting flat plate is in a range from 0.1 to 5 mm, and a distance between the first lens and the light-transmitting flat plate is in a range from 0.5 to 100 mm.

8. The optical structure according to claim 1, wherein at least one of the first surface and the second surface is aspheric or spherical.

9. The optical structure according to claim 1, further comprising:

a second lens, comprising a third surface and a fourth surface, and at least one of the third surface and the fourth surface is a non-planar surface, wherein the second lens is located between the first lens and the light-transmitting flat plate assembly, or the second lens is located at a side of the light-transmitting flat plate assembly away from the first lens.

10. A display device, comprising a display screen and the optical structure according to claim 1, wherein the display screen is located at a side of the first lens away from the light-transmitting flat plate assembly.

11. An optical structure, comprising:

a first lens, comprising a first surface and a second surface, wherein both the first surface and the second surface are non-planar surfaces;

a transflective film, located at a side of the first surface away from the second surface, wherein the optical structure further comprises a light-transmitting flat plate assembly located at a side of the second surface away from the first surface, and the light-transmitting flat plate assembly comprises a light-transmitting flat plate, a phase retardation film and a polarizing reflective film, the polarizing reflective film is located at a side of the phase retardation film away from the first lens, and both the phase retardation film and the polarizing reflective film are located on a flat plate surface of the light-transmitting flat plate or inside the light-transmitting flat plate;

the light-transmitting flat plate assembly further comprises a polarizing transmissive film, the polarizing transmissive film is located at a side of the polarizing reflective film away from the phase retardation film, and the polarizing transmissive film is located on the flat plate surface of the light-transmitting flat plate or inside the light-transmitting flat plate;

the light-transmitting flat plat comprises a plurality of sub-flat plates arranged along a direction parallel to an optical axis of the first lens, and each of the plurality of sub-flat plates comprises two flat plate surfaces arranged in parallel and perpendicular to the optical axis of the first lens;

at least one selected from the group consisting of the phase retardation film, the polarizing reflective film and the polarizing transmissive film is located on the flat plate surface, close to the first lens, of a sub-flat plate in the plurality of sub-flat plates which is closest to the first lens.

12. The optical structure according to claim 11, wherein the plurality of sub-flat plates comprise a first sub-flat plate and a second sub-flat plate, the first sub-flat plate is located between the second sub-flat plate and the first lens, and the phase retardation film is located on the flat plate surface of the first sub-flat plate facing the first lens, and the polarizing transmissive film is located between the first sub-flat plate and the second sub-flat plate.

13. The optical structure according to claim 11, wherein the plurality of sub-flat plates comprise a first sub-flat plate, a second sub-flat plate and a third sub-flat plate sequentially arranged, the first sub-flat plate is located between the second sub-flat plate and the first lens, and the phase retardation film is located on the flat plate surface of the first sub-flat plate facing the first lens, the polarizing reflective film is located between the first sub-flat plate and the second sub-flat plate, and the polarizing transmissive film is located between the second sub-flat plate and the third sub-flat plate.

14. The optical structure according to claim 11, wherein a focal length of the optical structure is in a range from 5 to 100 mm.

15. The optical structure according to claim 14, wherein, in a direction parallel to an optical axis of the first lens, a maximum thickness of the first lens is in a range from 1 to 10 mm, a thickness of the light-transmitting flat plate is in a range from 0.1 to 5 mm, and a distance between the first lens and the light-transmitting flat plate is in a range from 0.5 to 100 mm.

16. The optical structure according to claim 11, wherein at least one of the first surface and the second surface is aspheric or spherical.

17. An optical structure, comprising:

a first lens, comprising a first surface and a second surface, wherein both the first surface and the second surface are non-planar surfaces;

a transflective film, located at a side of the first surface away from the second surface, wherein the optical structure further comprises a light-transmitting flat plate assembly located at a side of the second surface away from the first surface, and the light-transmitting flat plate assembly comprises a light-transmitting flat plate, a phase retardation film and a polarizing reflective film, the polarizing reflective film is located at a side of the phase retardation film away from the first lens, and both the phase retardation film and the polarizing reflective film are located on a flat plate surface of the light-transmitting flat plate or inside the light-transmitting flat plate;

the light-transmitting flat plate assembly further comprises a polarizing transmissive film, the polarizing transmissive film is located at a side of the polarizing reflective film away from the phase retardation film, and the polarizing transmissive film is located on the flat plate surface of the light-transmitting flat plate or inside the light-transmitting flat plate;

the phase retardation film, the polarizing reflective film and the polarizing transmissive film are all arranged inside the light-transmitting flat plate, and a portion of the light-transmitting flat plate at a side of the phase retardation film away from the polarizing reflective film and a portion of the light-transmitting flat plate at a side of the polarizing transmissive film away from the phase retardation film are arranged as an integrated structure.

18. The optical structure according to claim 17, wherein a focal length of the optical structure is in a range from 5 to 100 mm.

19. The optical structure according to claim 18, wherein, in a direction parallel to an optical axis of the first lens, a maximum thickness of the first lens is in a range from 1 to 10 mm, a thickness of the light-transmitting flat plate is in a range from 0.1 to 5 mm, and a distance between the first lens and the light-transmitting flat plate is in a range from 0.5 to 100 mm.

20. The optical structure according to claim 17, wherein at least one of the first surface and the second surface is aspheric or spherical.

* * * * *